United States Patent
Willats

(10) Patent No.: US 11,225,894 B1
(45) Date of Patent: Jan. 18, 2022

(54) EXHAUST AFTERTREATMENT SYSTEM WITH THERMALLY CONTROLLED REAGENT DOSER

(71) Applicant: Faurecia Emissions Control Technologies, USA, LLC, Columbus, IN (US)

(72) Inventor: Robin Willats, Columbus, IN (US)

(73) Assignee: Faurecia Emissions Control Technologies, USA, LLC, Columbus, IN (US)

( * ) Notice: Subject to any disclaimer, the term of this patent is extended or adjusted under 35 U.S.C. 154(b) by 0 days.

(21) Appl. No.: 16/916,725

(22) Filed: Jun. 30, 2020

(51) Int. Cl.
*F01N 3/00* (2006.01)
*F01N 3/20* (2006.01)
*F01N 3/28* (2006.01)

(52) U.S. Cl.
CPC ........... *F01N 3/208* (2013.01); *F01N 3/2006* (2013.01); *F01N 3/2892* (2013.01); *F01N 2570/14* (2013.01); *F01N 2610/10* (2013.01); *F01N 2610/11* (2013.01); *F01N 2900/1811* (2013.01)

(58) Field of Classification Search
CPC ...... F01N 3/208; F01N 3/2892; F01N 3/2006; F01N 2610/10; F01N 2610/11; F01N 2900/1811; F01N 2570/14
See application file for complete search history.

(56) References Cited

U.S. PATENT DOCUMENTS

| | | | |
|---|---|---|---|
| 4,486,270 A | 12/1984 | Kaasenbrood | |
| 5,240,688 A | 8/1993 | von Harpe | |
| 5,590,521 A | 1/1997 | Schnaibel | |
| 5,605,042 A * | 2/1997 | Stutzenberger | F01N 3/2066 60/286 |
| 5,827,490 A | 10/1998 | Gordon | |
| 6,077,491 A | 6/2000 | Cooper | |
| 6,513,323 B1 * | 2/2003 | Weigl | F01N 3/2066 60/286 |
| 7,449,162 B2 | 11/2008 | Schaller | |

(Continued)

FOREIGN PATENT DOCUMENTS

| CH | 707551 | 8/2014 |
|---|---|---|
| CN | 104265422 | 1/2015 |

(Continued)

OTHER PUBLICATIONS

Zhanfeng Qi, Shusen Li, Xiuli Guo, "Development, Application and Direction of Development of Urea-SCR", International Journal of Multimedia and Ubiquitous Engineering, 2016, pp. 131-142, vol. 11, Issue No. 2016.

(Continued)

*Primary Examiner* — Matthew T Largi
(74) *Attorney, Agent, or Firm* — Barnes & Thornburg LLP

(57) ABSTRACT

An exhaust aftertreatment system for use with an over-the-road vehicle is disclosed. The exhaust aftertreatment system includes a flash-boil doser mounted to an exhaust conduit and a catalyst coupled to the exhaust conduit. The flash-boil doser configured to inject heated and pressurized reducing agent into an exhaust passageway defined by the exhaust conduit for distribution throughout exhaust gases passed through the exhaust conduit. The catalyst configured to react the reducing agent with the nitrous oxide in the flow of exhaust gases to provide treated exhaust gases with a reduced nitrous oxide amount.

16 Claims, 4 Drawing Sheets

(56) References Cited

U.S. PATENT DOCUMENTS

Figure 1:
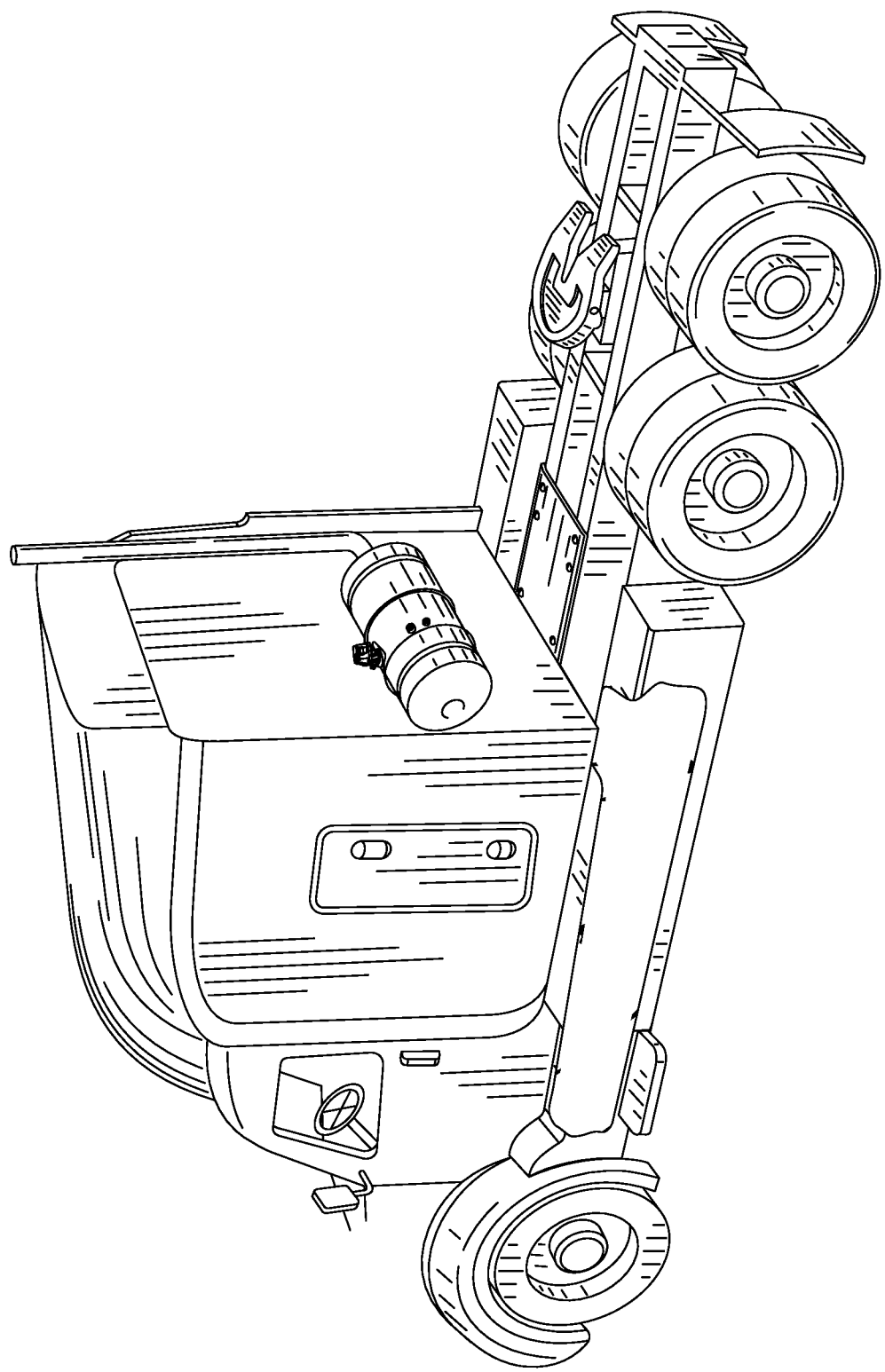

| | | | |
|---|---|---|---|
| 7,595,034 B2 | 9/2009 | Nissinen | |
| 7,984,609 B2 | 7/2011 | Doering | |
| 8,100,191 B2* | 1/2012 | Beheshti | A62C 35/02 |
| | | | 169/68 |
| 8,413,427 B2 | 4/2013 | Mullins | |
| 8,418,443 B2 | 4/2013 | Millet | |
| 8,518,354 B2 | 8/2013 | Ayyappan | |
| 8,763,372 B2 | 7/2014 | Pohl | |
| 8,800,276 B2 | 8/2014 | Levin | |
| 8,893,484 B2 | 11/2014 | Park | |
| 8,967,484 B2 | 3/2015 | Nishizawa | |
| 8,980,181 B2 | 3/2015 | Qi | |
| 9,072,850 B2 | 7/2015 | McIntosh | |
| 9,341,100 B2 | 5/2016 | Petry | |
| 9,512,760 B2 | 12/2016 | Clayton, Jr. | |
| 9,598,977 B2 | 3/2017 | Meyer | |
| 9,683,447 B2 | 6/2017 | Gentile | |
| 9,687,782 B1 | 6/2017 | Miao | |
| 9,732,650 B2 | 8/2017 | Tomita | |
| 9,771,850 B2 | 9/2017 | Henry | |
| 10,337,380 B2 | 7/2019 | Willats | |
| 2003/0079467 A1 | 5/2003 | Liu | |
| 2005/0045179 A1 | 3/2005 | Faison | |
| 2006/0218902 A1 | 10/2006 | Arellano | |
| 2009/0031713 A1 | 2/2009 | Suzuki | |
| 2009/0223211 A1 | 9/2009 | Brueck | |
| 2009/0229258 A1* | 9/2009 | Zapf | F04B 23/00 |
| | | | 60/295 |
| 2009/0294552 A1 | 12/2009 | Trapasso | |
| 2010/0242439 A1* | 9/2010 | Domon | F01N 3/208 |
| | | | 60/274 |
| 2012/0322012 A1 | 12/2012 | Tsumagari | |
| 2013/0232956 A1 | 9/2013 | Loman et al. | |
| 2013/0239549 A1 | 9/2013 | Henry | |
| 2013/0259755 A1* | 10/2013 | Kim | B01D 53/9431 |
| | | | 422/111 |
| 2014/0314644 A1 | 10/2014 | Bugos | |
| 2014/0352280 A1* | 12/2014 | Qi | F01N 3/208 |
| | | | 60/274 |
| 2014/0363358 A1 | 12/2014 | Udd | |
| 2015/0135683 A1 | 5/2015 | Petry | |
| 2015/0315950 A1 | 11/2015 | Hagimoto | |
| 2016/0017780 A1 | 1/2016 | Kinugawa | |
| 2016/0053652 A1 | 2/2016 | van Vuuren | |
| 2016/0061083 A1 | 3/2016 | Pramas | |
| 2017/0122169 A1 | 5/2017 | Ettireddy | |
| 2017/0198621 A1 | 7/2017 | Gaiser | |
| 2017/0204762 A1 | 7/2017 | Kotrba | |
| 2018/0080360 A1 | 3/2018 | Kurpejovic | |
| 2018/0142593 A1 | 5/2018 | Wang | |
| 2019/0383187 A1 | 12/2019 | Sarsen | |
| 2020/0131966 A1 | 4/2020 | Jeannerot | |
| 2020/0318518 A1* | 10/2020 | Kinnaird | F01N 3/021 |

FOREIGN PATENT DOCUMENTS

| | | |
|---|---|---|
| DE | 102009005012 | 7/2010 |
| DE | 102017101310 | 8/2017 |
| DE | 102018209405 | 12/2019 |
| EP | 2140117 | 1/2010 |
| EP | 2167860 | 3/2010 |
| EP | 2302276 | 3/2011 |
| EP | 2543837 | 1/2013 |
| EP | 2870331 | 5/2015 |
| EP | 3330222 | 6/2018 |
| EP | 3581773 | 12/2019 |
| GB | 2552040 | 1/2018 |
| GB | 2562178 | 11/2018 |
| GB | 2568269 | 5/2019 |
| JP | 2015078643 | 4/2015 |
| JP | 2020139426 | 9/2020 |
| KR | 20170013687 | 2/2017 |
| WO | 199956858 | 11/1999 |
| WO | 2005025725 | 3/2005 |
| WO | 2006087553 | 8/2006 |
| WO | 2007124791 | 11/2007 |
| WO | 2008077587 | 7/2008 |
| WO | 2008108955 | 9/2008 |
| WO | 2013036308 | 3/2013 |
| WO | 2018075061 | 4/2018 |
| WO | 2018100187 | 6/2018 |

OTHER PUBLICATIONS

Tue Johannessen, "Compact ammonia storage systems for fuel-efficient NOX emissions reduction", CTI conference on SCR Systems, Jul. 5, 2010.

Anu Solla, Marten Westerholm, Christer Soderstrom, Kauko Tormonen, "Effect of Ammonium Formate and Mixtures of Urea and Ammonium Formate on Low Temperature Activity of SCR Systems", SAE International, 2005.

Daniel Peitz, "Investigations on the catalytic decomposition of guanidinium formate, ammonium formate and methanamide as NH3-precuresors for the selective catalytic reduction of NOX", Univeristy of Erlangen-Nuremberg, 2010.

Extended European Search Report for European Appl. No. 19207724.6, dated Feb. 26, 2020, 8 pages.

Extended European Search Report for European Appl. No. 19203355.3, dated Feb. 26, 2020, 9 pages.

Extended European Search Report for European Appl. No. 19207953.1, dated Mar. 13, 2020, 7 pages.

Office Action dated Apr. 3, 2020, for U.S. Appl. No. 16/184,567 (pp. 1-15).

* cited by examiner

EXHAUST AFTERTREATMENT SYSTEM WITH THERMALLY CONTROLLED REAGENT DOSER

BACKGROUND

The present disclosure relates to exhaust aftertreatment systems for automotive applications, and particularly to the incorporation of reagent dosers into such systems.

SUMMARY

An automotive exhaust aftertreatment system for dosing reducing agent into a flow of exhaust gases to reduce nitrous oxides in the flow of exhaust gases is described in this paper. The exhaust aftertreatment system includes an exhaust conduit and a reducing agent mixer having a mixing can and a doser mounted to the mixing can. The mixer is configured to mix a reducing agent injected by the doser with exhaust gas moving through the system. The mixing of the reducing agent with exhaust gas is designed to cause a chemical reaction and reduce Nitrous Oxides (NOx) in the exhaust gas when reacted by the catalyst.

In the illustrative embodiments, the doser includes a doser body, plurality of valves, and a thermal management system. The doser body includes a housing that defines an internal chamber, an inlet passageway that opens into the internal chamber to admit reducing agent from an associated reducing agent tank, and an outlet passageway that opens from the internal chamber into the exhaust passageway. The plurality of valves includes an inlet valve and an outlet valve that are configured to selectively allow or block flow of reducing agent through the respective inlet or outlet passageway. The thermal management system is configure to manage the temperature of the components in the doser.

In illustrative embodiments, the thermal management system includes a heater and at least one cooling element. The heater is configured to selectively heat reducing agent in the internal chamber of the housing before injection of the reducing agent into the exhaust passageway. Heating the reducing agent prior to injection into the exhaust passageway encourages reaction with the exhaust gases to improve reduction of NOx in the exhaust gases. The cooling element is coupled to at least one electronic component included in the doser to cool the at least one electric component so as to prevent the at least one electronic component from overheating during operation of the doser in the exhaust aftertreatment system.

Additional features of the present disclosure will become apparent to those skilled in the art upon consideration of illustrative embodiments exemplifying the best mode of carrying out the disclosure as presently perceived.

BRIEF DESCRIPTIONS OF THE DRAWINGS

Figure 2:
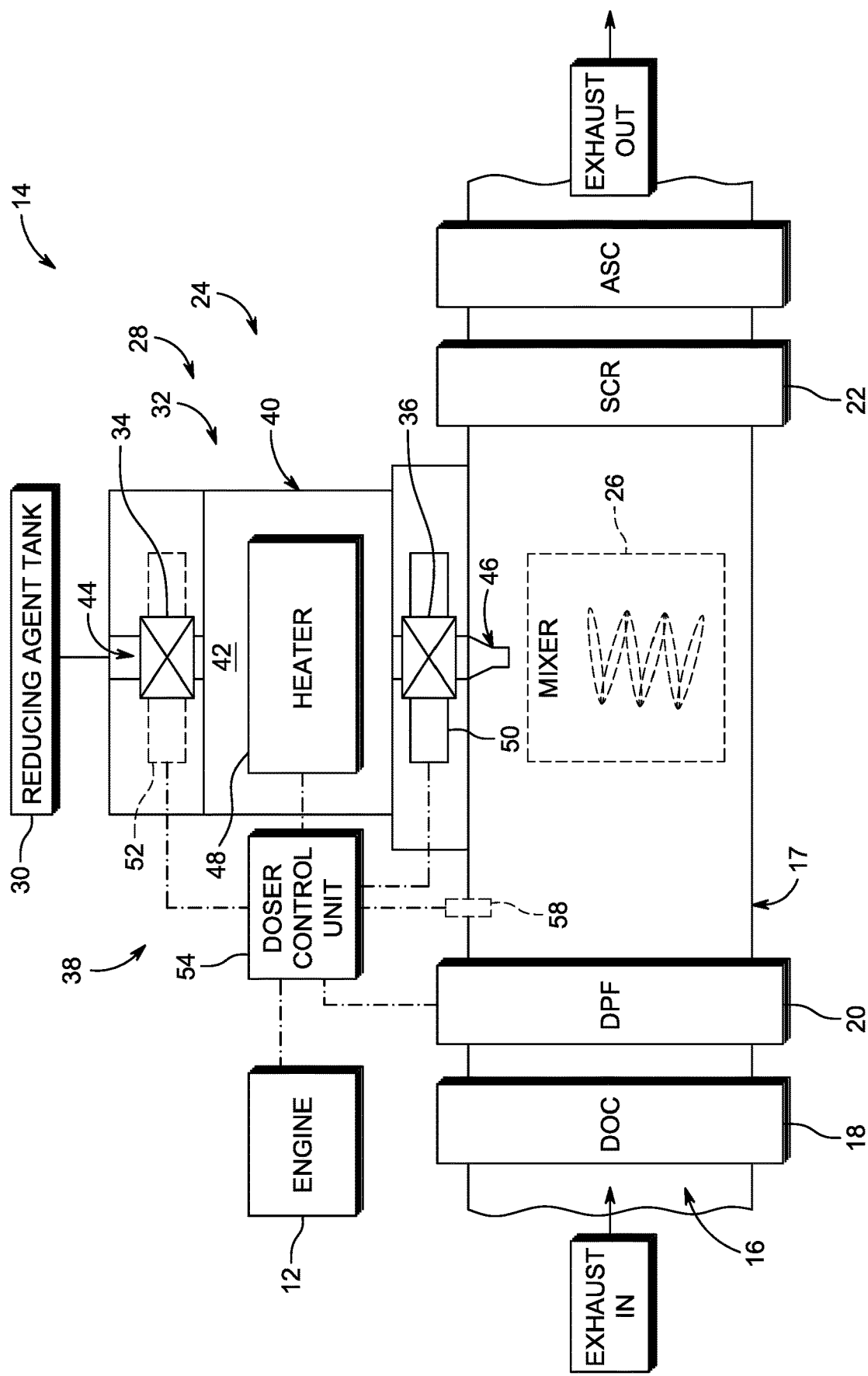
Figure 3:
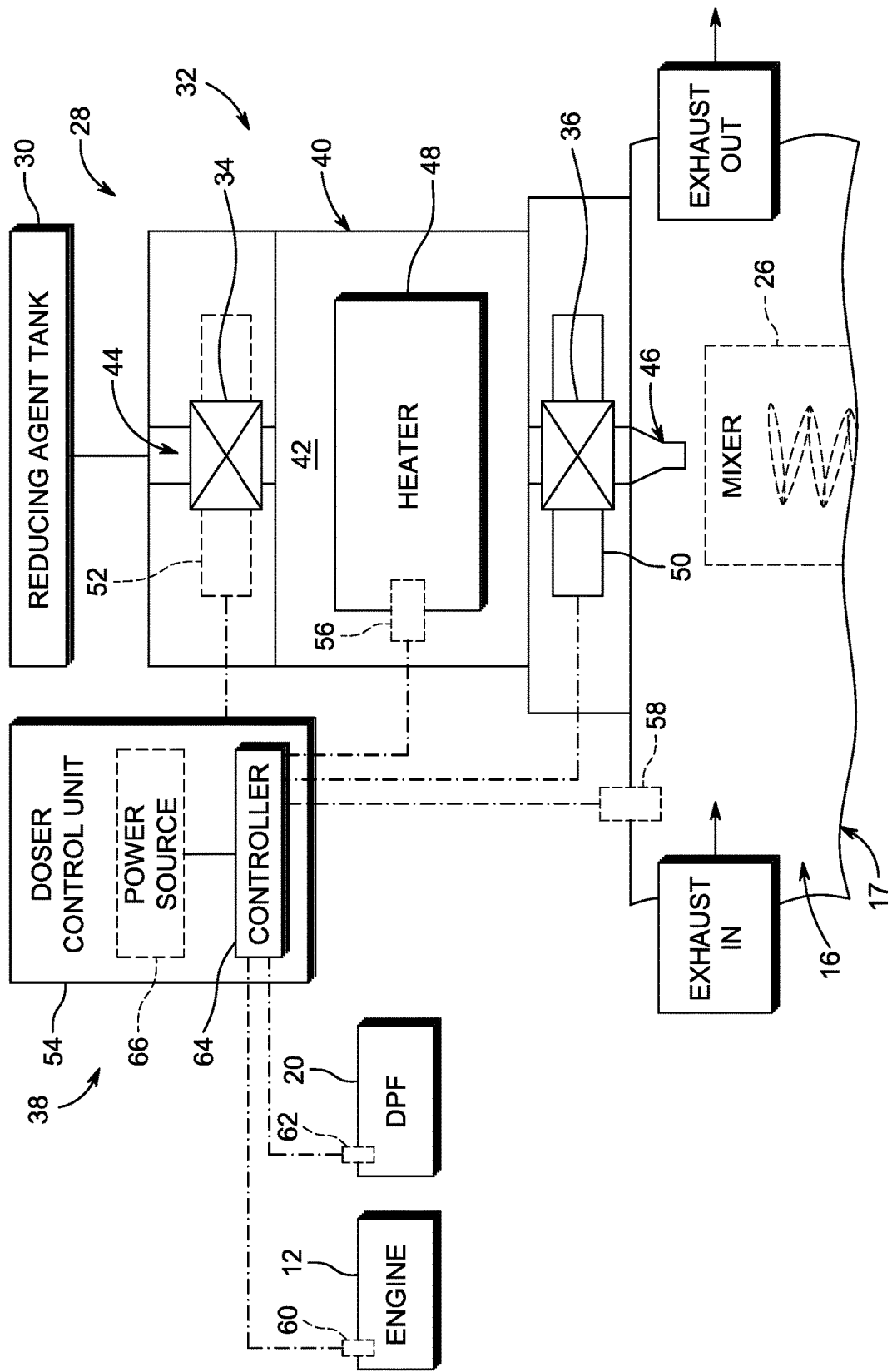
Figure 4:
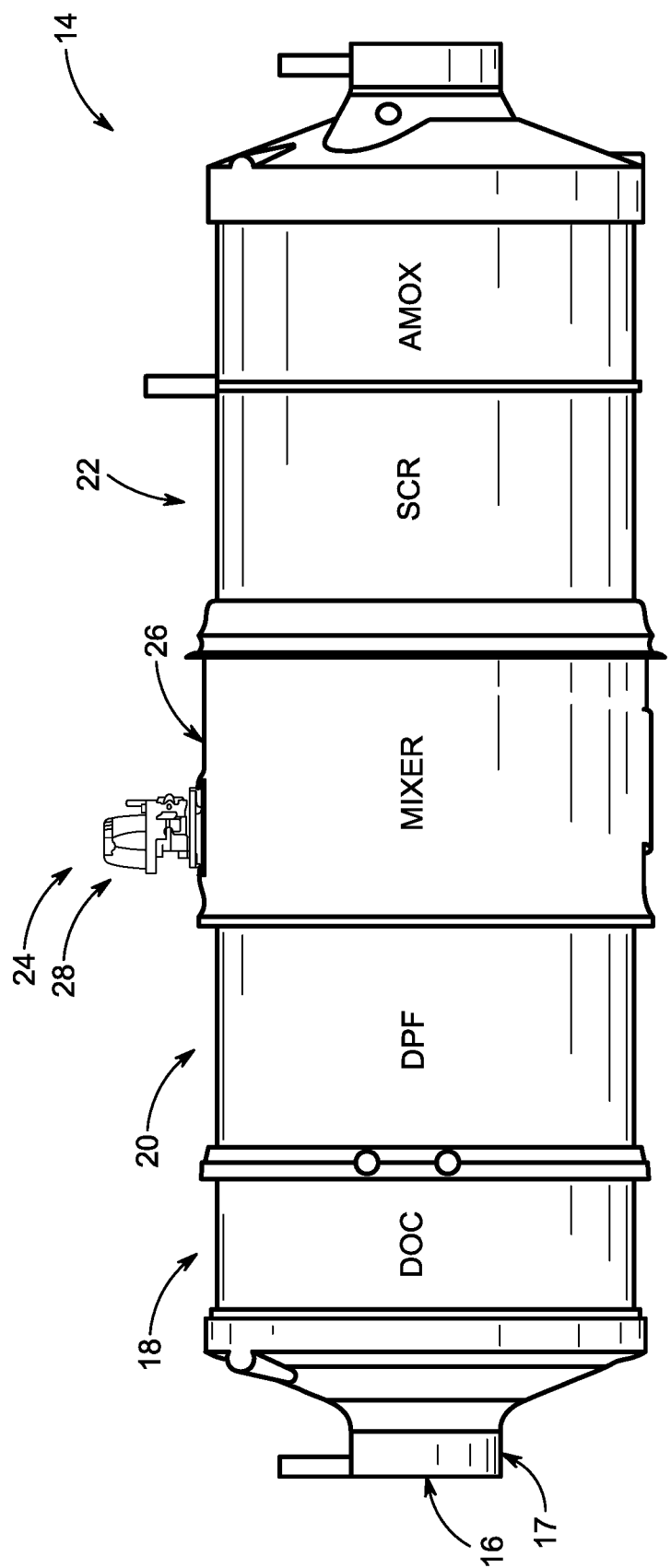

The detailed description particularly refers to the accompanying figures in which:

FIG. 1 is perspective view of an over-the-road automotive vehicle including an internal combustion engine and an exhaust aftertreatment system with a doser configured to deliver a reducing agent into engine exhaust gases flowing through an exhaust passageway define by an exhaust conduit;

FIG. 2 is a diagrammatic view of the exhaust aftertreatment system included in the over-the-road vehicle of FIG. 1 showing that the doser includes a doser body that includes inlet and outlet passageway to admit reducing agent into the doser, a plurality of valves to control the flow through the inlet and outlet passageway, and a thermal management system configured to control the temperature of the components included in the doser;

FIG. 3 is a detail diagrammatic view of the doser included in the system of FIG. 2 showing the thermal management system of the doser includes a heater arranged in the doser body to selectively heat reducing agent before injection of the reducing agent into the exhaust passageway and cooling elements coupled to the valves to cool the electronic components of the valves so as to prevent the valves from overheating during operation of the doser in the exhaust aftertreatment system; and FIG. 4 is a side elevation view of the exhaust aftertreatment system included in the over-the-road vehicle of FIG. 1 showing the doser mounted to a mixer can located downstream of a diesel particulate filter included in the exhaust aftertreatment system.

DETAILED DESCRIPTION

For the purposes of promoting an understanding of the principles of the disclosure, reference will now be made to a number of illustrative embodiments illustrated in the drawings and specific language will be used to describe the same.

An illustrative over-the-road vehicle 10 includes an engine 12 and an exhaust aftertreatment system 14 in accordance with the present disclosure is shown, for example, in FIG. 1. The engine 12 is, illustratively, an internal combustion engine 12 configured to combust fuel and discharge exhaust gases that are carried through an exhaust passageway 16 defined by an exhaust conduit 17, treated by the exhaust aftertreatment system 14, and then released into the atmosphere. The exhaust aftertreatment system 14 is configured to reduce various effluents in the exhaust gases, such as, for example, nitrogen oxides (NOx), before the exhaust gases are released to the atmosphere.

In the illustrative embodiment, the exhaust aftertreatment system 14 includes a plurality of exhaust aftertreatment devices such as, for example, a diesel oxidation catalyst (DOC) 18, a diesel particulate filter (DPF) 20, and a selective catalytic reduction unit (SCR) 22, and a reducing agent mixer 24. The exhaust gases pass through or by each of the aftertreatment devices to remove or reduce different effluents. The reducing agent mixer 24 is mounted upstream of the SCR 22 and is configured to inject and mix a reducing agent, illustratively a urea solution, into the exhaust gases. Chemical reaction of the reducing agent with the exhaust gases occurs in downstream of the reducing agent mixer 24 in the SCR 22 to reduce $NO_x$ to produce treated exhaust gases before being released in the atmosphere.

The reducing agent mixer 24 includes a mixing can 26 and a doser 28 as shown in FIGS. 1 and 2. The mixing can 26 is coupled fluidly with the exhaust passageway 16 to receive the exhaust gases flowing therethrough. The reducing agent is stored on the vehicle 10 in a reducing agent tank 30 and is conducted to the doser 28 to be injected into the mixing can 26.

The doser 28 includes a doser body 32, a plurality of valves 34, 36, and a thermal management system 38 as shown in FIGS. 2 and 3. The doser body 32 includes a housing 40 that defines an internal chamber 42, an inlet passageway 44, and an outlet passageway 46. The inlet passageway 44 opens into the internal chamber 42 to admit reducing agent from the reducing agent tank 30, while the outlet passageway 46 opens from the internal chamber 42 into the exhaust passageway 16 of the exhaust aftertreatment system 14. The valves 34, 36 include an inlet valve 34 that selectively allows or blocks a flow of reducing agent through the inlet passageway 44 into the internal chamber 42 and an outlet valve 36 that selectively allows or blocks a flow of reducing agent through the outlet passageway 46 into the exhaust passageway 16. The thermal management system 38 is configured to manage the temperature of the components included in the doser 28.

The thermal management system 38 includes a heater 48, at least one cooling element 50 and a control unit 54 as shown in FIGS. 2 and 3. The heater 48 is configured to selectively heat reducing agent in the internal chamber 42 of the housing 40 before injection of the reducing agent into the exhaust passageway 16. The cooling element 50 is coupled to at least one electronic component included in the doser 28 to cool the at least one electric component so as to prevent the at least one electronic component from overheating during operation of the doser 28 in the exhaust aftertreatment system 14. The control unit 54 is configured to direct the heater 48 to selectively apply heat and the cooling element 50 to selectively cool the components in the doser 28.

In some embodiments, the doser 28 may be a flash-boil doser 28. The heater 48 may be configured to heat the reducing agent in the internal chamber 42 and thereby increase a pressure within the internal chamber 42 in the housing 40 to drive injection of the reducing agent into the exhaust passageway 16.

As the heater 48 increases the temperature of the reducing agent within the internal chamber 42, other components of the doser 28, such as the valves 34, 36 may also be heated. Each of the valves 34, 36 have electronic components (i.e. actuation coils) that may be damaged if heated above an allowable temperature. As such, the cooling element 50 is in contact with the outlet valve 36 to cool the outlet valve 36 and prevent the electronic components of the valve 36 from overheating during use of the doser 28.

In the illustrative embodiment, the cooling element 50 is a thermoelectric cooling element 50 that is configured to cool the outlet valve 36 when supplied electronic energy. Unlike coolant loops that may use fluid coolant from other cooling systems of the engine 12, the thermoelectric cooling element 50 allows the cooling of the electric components of the doser 28 to be independently controlled from other components of the engine 12 or the system 14.

The control unit 54 is configured to selectively supply the thermoelectric cooling element 50 with power to control the cooling of the outlet valve 36. The thermoelectric cooling element 50 therefore eliminates integrating the thermal management system 38 of the doser 28 with other cooling systems of the engine 12. The thermoelectric cooling element 50 also minimizes the space that would otherwise be needed to integrate fluid base cooling into the doser 28.

In some embodiments, the thermal management system 38 may include a first cooling element 50 and a second cooling element 52 as suggested in FIGS. 2 and 3. The first cooling element 50 is in contact with an outer surface of the outlet valve 36 to cool the outlet valve 36. The second cooling element 52 is in contact with an outer surface of the inlet valve 34 to cool the inlet valve 34. In other embodiments, the first cooling element 50 may be in contact with the inlet valve 34 and the outlet valve 36 to cool both the inlet and outlet valve 34, 36.

The control unit 54 is coupled to the cooling elements 50, 52, the doser 28, and the exhaust conduit 17 as shown in FIGS. 2 and 3. The control unit 54 is configured to direct the thermoelectric cooling elements 50, 52 to cool the respective valves 34, 36 in response to at least one of (i) a temperature within the doser body 32 exceeding a predetermined agent value and (ii) a temperature of the exhaust gases in the exhaust passageway 16 exceeding a predetermined exhaust gas value.

As the heater 48 heats the reducing agent in the internal chamber 42, temperature of the outlet valve 36 and/or the inlet valve 34 may increase through conductive heating. To ensure the electronic components of the valves 34, 36 are not overheated; the control unit 54 is configured to direct the thermoelectric cooling elements 50, 52 to cool the valves 34, 36 in response to the temperature within the doser body 32 exceeding the predetermined agent value.

The components of the doser 28 may also be heated by the flow of exhaust gases in the exhaust passageway 16. As the doser 28 is mounted to the mixing can 26, the exhaust gases in the exhaust passageway 16 may convectively heat the doser 28. At high duty cycles, the temperature of the exhaust gases are high and may overheat the electronic components of the doser 28. As such, the control unit 54 may also be configured to direct the thermoelectric cooling elements 50, 52 to cool the valves 34, 36 in response to the temperature of the exhaust gases in the exhaust passageway 16 exceeding the predetermined exhaust gas value.

Other conditions that produce high temperatures within the aftertreatment system 14 may include high engine loads, hot shutdown of the engine 12, and regeneration of the diesel particulate filter 20. High engine loads or high power density of the engine 12 may expose the doser 28 to high temperatures of around 650 degree Celsius. The diesel particulate filter 20 is coupled to the exhaust passageway 16 upstream or downstream of the doser 28. As such, regeneration of the diesel particulate filter 20 may also expose the doser 28 to high temperatures of around 150 degrees Celsius.

The control unit 54 may also be coupled to the engine 12 and configured to direct the cooling elements 50, 52 to selectively cool the valves 34, 36 in response to a temperature of the internal combustion engine 12 exceeding an engine value. The control unit 54 may also be configured to direct the cooling elements 50, 52 to cool the valves 34, 36 in response to a signal that the doser 28 is not injecting the reducing agent and a signal that the engine 12 is running.

The control unit 54 may also be configured to direct the cooling elements 50, 52 to cool the valves 34, 36 in response to a hot engine shut down signal. The hot engine shut down signal received by the control unit 54 indicates that the engine 12 has been shut off, but the temperature of the engine 12 remains above the predetermined engine value.

The control unit 54 may also be coupled to the diesel particulate filter 20 and configured to direct the cooling elements 50, 52 to selectively cool the valves 34, 36 in response to the regeneration of the diesel particulate filter 20. The control unit 54 may also be configured to direct the cooling elements 50, 52 to selectively cool the valves 34, 36 in response to a temperature of the diesel particulate filter 20 exceeding a predetermined filter temperature value.

The control unit 54 may include a plurality of sensors 56, 58, 60, 62 and a controller 64 as suggested in FIGS. 2 and 3. The plurality of sensors 56, 58, 60, 62 are coupled to different parts of the aftertreament system 14 or the engine 12 to measure temperatures within the system 14 and the engine 12. The controller 64 is coupled to each of the sensors 56, 58, 60, 62, the heater 48, and the thermoelectric cooling elements 50, 52 to control the heater 48 and the thermoelectric cooling elements 50, 52 based on information measured by the sensors 56, 58, 60, 62.

The plurality of sensors 56, 58, 60 may include a first sensor 56 coupled to the doser 28, a second sensor 58 coupled to the exhaust passageway 16, a third sensor 60 coupled to the engine 12, and a fourth sensor 62 coupled to the diesel particulate filter 20. The first sensor 56 is configured to measure the temperature of the reducing agent in the doser 28. The second sensor 58 is configured to measure the temperature of the exhaust gases in the exhaust passageway 16. The third sensor 60 is configured to measure the temperature of the engine 12. The fourth sensor 62 is configured to measure the temperature in the diesel particulate filter 20.

In other embodiments, the first sensor 56 may be a virtual temperature sensor 56. The control unit 54 may be configured to determine a virtual temperature of the reducing agent in the doser 28. The control unit 54 may be configured to determine the virtual temperature of the reducing agent based on measured input parameters outside the doser 28 so as to provide the virtual reagent temperature sensor 56. Such a virtual reagent temperature sensor is discussed more in-depth in U.S. Utility patent application Ser. No. 16/711,729 filed Dec. 12, 2019. The disclosure of which is expressly incorporated by reference herein.

The controller 64 is configured to direct the cooling element 50, 52 to cool the respective valve 34, 36 in response to the temperature measured by the first sensor 56 being above the predetermined agent temperature value. The controller 64 is also configured to direct the cooling element 50, 52 to cool the respective valve 34, 36 in response to the temperature measured by the second sensor 58 being above the predetermined exhaust gas temperature value.

The controller 64 may also be configured to direct the cooling element 50, 52 to cool the respective valve 34, 36 in response to the temperature measured by the third sensor 60 being above a predetermined engine temperature value. The controller 64 may also be configured to direct the cooling elements 50, 52 to cool the respective valve 34, 36 in response to the temperature measured by the fourth sensor 62 being above the predetermined filter temperature value.

The controller 64 may be coupled to the engine 12 and the diesel particulate filter 20 as shown in FIGS. 2 and 3. The controller 64 may also be configured to direct the cooling elements 50, 52 to cool the valves 34, 36 in response to a signal that the doser 28 is not injecting the reducing agent and a signal that the engine 12 is running.

The controller 64 may also be configured to direct the cooling elements 50, 52 to cool the valves 34, 36 in response to the controller 64 receiving a hot engine shut down signal. The hot engine shut down signal received by the controller 64 indicates that the engine 12 has been shut off, but the temperature of the engine 12 remains above the predetermined engine temperature value.

The controller 64 may also be configured to direct the at least one cooling element 50, 52 to cool the valves 34, 36 in response to the controller 64 receiving a regeneration signal from the diesel particulate filter 20. The regeneration signal received by the controller 64 indicates that the regeneration of the diesel particulate filter 20 has begun or is occurring.

The controller 64 is also configured to vary the electrical energy supplied to the thermoelectric cooling elements 50, 52 to control the level of cooling of the valves 34, 36. To increase cooling of the valves 34, 36, the controller 64 increases the electrical energy supplied to the thermoelectric cooling elements 50, 52. Conversely, the controller 64 decreases the electrical energy suppled to the thermoelectric cooling elements 50, 52 to decrease the cooling of the valves 34, 36.

In the illustrative embodiments, the cooling of the outlet valve 36 is independent of the inlet valve 34. The controller 64 is configured to supply a different amount of electrical energy to the thermoelectric cooling element 50 than the amount of electric energy supplied to the thermoelectric cooling element 52.

In some embodiments, the control unit 54 may further include a power source 66 as suggested in FIG. 3. The power source 66 may be coupled to the controller 64 and configured to supply the electrical energy to the thermoelectric cooling elements 50, 52. In other embodiments, the thermoelectric cooling elements 50, 52 may be supplied electric energy from other power source in the engine 12 or the aftertreatment system 14.

A method to control the thermal management system 38 of the doser 28 is also provided in this application. The thermal management system 38 of the doser 28 determines when the reducing agent should be heated, when the components of the doser 28 should be cooled. The need to maintain sufficient heating of the reducing agent in the doser 28 is desired in many implementations to maintain efficiency of the doser 28 during cold start and extended low load/low duty cycles. However, the need to manage the temperature of the electronic components in the doser 28 is desired in many implementations to maintain the integrity of the electronic components during use of the doser 28. A control algorithm will use exhaust flow, exhaust temperature, and/or stored energy levels—among other things—to determine when to heat or cool the doser 28.

The present disclosure relates to thermal protection the electric components of a doser 28 adapted for dosing reducing agent into exhaust gases under high temperature operating conditions. The thermoelectric cooling elements 50, 52 are used to provide electrically powered cooling of the actuator coils in the valves 34, 36. The thermoelectric cooling elements 50, 52 are controlled based on temperatures measured within the doser 28.

The thermoelectric cooling elements 50, 52 may eliminate other coolant loops, saving coolant integration with the engine 12. The thermoelectric cooling elements 50, 52 may also minimize the space need in the doser 28 compared to fluid based cooling elements.

Thermoelectric cooling elements 50, 52 use thermoelectric materials that generate a hot side and a cold side when a voltage is applied to the material. The hot and cold side of the thermoelectric material promote heat transfer.

The power and control of the thermoelectric cooling elements 50, 52 may be controlled by a doser control unit 54. Under conditions of high temperature exhaust gas and/or hot engine shut down, the control unit 54 detects the high temperatures and activates the thermoelectric cooling elements 50, 52.

The following numbered clauses include embodiments that are contemplated and non-limiting:

Clause 1. A doser adapted for use in an exhaust aftertreatment system to inject a reducing agent into an exhaust passageway of the exhaust aftertreatment system, the doser comprising a doser body including a housing that defines a internal chamber, an inlet passageway that opens into the internal chamber to admit reducing agent from an associated reducing agent tank, and an outlet passageway that opens from the internal chamber into the exhaust passageway, a plurality of valves including an inlet valve configured to selectively allow or block a flow of reducing agent through the inlet passageway into the housing and an outlet valve configured to selectively allow or block a flow of reducing agent through the outlet passageway into the exhaust passageway, and a thermal management system including a heater configured to selectively heat reducing agent in the internal chamber of the housing before injection of the reducing agent into the exhaust passageway and at least one cooling element coupled to at least one electronic component included in the doser to cool the at least one electronic component so as to prevent the at least one electronic component from overheating during operation of the doser in the exhaust aftertreatment system.

Clause 2. The doser of clause 1, any other suitable clause, or any combination of clauses, wherein the cooling element is a thermoelectric cooling element configured to cool the at least one electronic component when supplied electronic energy.

Clause 3. The doser of clause 2, any other suitable clause, or any combination of clauses, wherein the at least one electronic component is the outlet valve and the cooling element is in contact with the outlet valve to cool the outlet valve.

Clause 4. The doser of clause 2, any other suitable clause, or any combination of clauses, wherein the at least one electronic component is either the inlet valve or the outlet valve and the cooling element is in contact with the inlet valve or the outlet valve to cool the inlet valve or the outlet valve.

Clause 5. The doser of clause 4, any other suitable clause, or any combination of clauses, wherein the thermal management system includes two electronic components, the two electronic components are the inlet valve and the outlet valve, and the at least one cooling element is in contact with the inlet valve and the outlet valve to cool the inlet valve and the outlet valve.

Clause 6. The doser of clause 5, any other suitable clause, or any combination of clauses, wherein the thermal management system further includes a control unit coupled to the cooling element.

Clause 7. The doser of clause 6, any other suitable clause, or any combination of clauses, wherein the control unit is configured to direct the thermoelectric cooling element to cool the outlet valve in response to at least one of (i) a temperature within the doser body exceeding a predetermined agent temperature value and (ii) a temperature of the exhaust gases in the exhaust passageway exceeding a predetermined exhaust gas temperature value.

Clause 8. The doser of clause 7, any other suitable clause, or any combination of clauses, wherein the control unit includes a temperature sensor configured to measure a temperature of the reducing agent in doser body and a controller coupled to the cooling element and the temperature sensor, and wherein the controller is configured to direct the cooling element to cool the outlet valve in response to the temperature measured by the temperature sensor being above the predetermined agent temperature value.

Clause 9. The doser of clause 7, any other suitable clause, or any combination of clauses, wherein the control unit includes a temperature sensor configured to measure a temperature of the exhaust gases in the exhaust passageway and a controller coupled to the cooling element and temperature sensor.

Clause 10. The doser of clause 9, any other suitable clause, or any combination of clauses, and wherein the controller is configured to direct the cooling element to cool the outlet valve in response to the temperature measured by the temperature sensor being above the predetermined exhaust gas value.

Clause 11. The doser of clause 2, any other suitable clause, or any combination of clauses, wherein the at least one electronic component is the inlet valve and the cooling element is in contact with the inlet valve to cool the inlet valve.

Clause 12. The doser of clause 1, any other suitable clause, or any combination of clauses, wherein the thermal management system includes a first cooling element in contact with the outlet valve to cool the outlet valve and a second cooling element in contact with the inlet valve to cool the inlet valve.

Clause 13. The doser of clause 12, any other suitable clause, or any combination of clauses, wherein the thermal management system further includes a control unit coupled to the first and second cooling elements and the doser.

Clause 14. The doser of clause 13, any other suitable clause, or any combination of clauses, wherein the control unit is configured to direct each of the first and second cooling elements to selectively cool the respective electronic component to control the temperature of the electronic component included in the doser in response to at least one of (i) a temperature within the doser body exceeding a predetermined agent temperature value and (ii) a temperature of the exhaust gases in the exhaust passageway exceeding a predetermined exhaust gas temperature value.

Clause 15. An exhaust aftertreatment system for dosing reducing agent into a flow of exhaust gases to reduce nitrous oxides in the flow of exhaust gases, the system comprising an exhaust conduit defining an exhaust passageway for receiving the flow of exhaust gases therein, and a reducing agent mixer fluidly coupled with the exhaust conduit and configured to receive the flow of exhaust gases and inject the reducing agent into the flow of exhaust gases.

Clause 16. The system of clause 15, any other suitable clause, or any combination of clauses, wherein the reducing gent mixer includes a mixing can defining at least a portion of the exhaust passageway for receiving the flow of exhaust gases therein and a doser mounted to the mixing can and configured to inject the reducing agent into the exhaust passageway of the exhaust aftertreatment system.

Clause 17. The system of clause 16, any other suitable clause, or any combination of clauses, wherein the doser comprises (i) a doser body including a housing that defines a internal chamber, an inlet passageway that opens into the internal chamber to admit reducing agent from an associated reducing agent tank, and an outlet passageway that opens from the internal chamber into the exhaust passageway, (ii) a plurality of valves including an inlet valve configured to selectively allow or block a flow of reducing agent through the inlet passageway into the housing and an outlet valve configured to selectively allow or block a flow of reducing agent through the outlet passageway into the exhaust passageway, and (iii) a thermal management system including a heater configured to selectively heat reducing agent in the internal chamber of the housing before injection of the reducing agent into the exhaust passageway and at least one cooling element coupled to at least one electronic component included in the doser to cool the at least one electric component so as to prevent the at least one electronic component from overheating during operation of the doser in the exhaust aftertreatment system.

Clause 18. The system of clause 17, any other suitable clause, or any combination of clauses, wherein the thermal management system further includes a control unit coupled to the at least one cooling element and the doser.

Clause 19. The system of clause 18, any other suitable clause, or any combination of clauses, wherein the control unit is configured to direct the cooling element to selectively cool the at least one electronic component in response to at least one of (i) a temperature within the doser body exceeding a predetermined agent temperature value and (ii) a temperature of the exhaust gases in the exhaust passageway exceeding a predetermined exhaust gas temperature value.

Clause 20. The system of clause 19, any other suitable clause, or any combination of clauses, further comprising a diesel particulate filter fluidly coupled to the exhaust passageway.

Clause 21. The system of clause 20, any other suitable clause, or any combination of clauses, wherein the control unit is coupled to the diesel particulate filter and configured to direct the at least one cooling element to selectively cool the at least one electronic component in response to a temperature of the diesel particulate filter exceeding a predetermined filter temperature value.

Clause 22. An over the road vehicle, the vehicle comprising an internal combustion engine configured to produce a flow of exhaust gases that are conducted through an exhaust passageway defined by an exhaust conduit, and an exhaust aftertreatment system comprising a mixing can defining at least a portion of the exhaust passageway for receiving the flow of exhaust gases therein, and a doser mounted to the mixing can and configured to inject the reducing agent into the exhaust passageway of the exhaust aftertreatment system.

Clause 23. The vehicle of clause 22, any other suitable clause, or any combination of clauses, wherein the doser comprises (i) a doser body including a housing that defines a internal chamber, an inlet passageway that opens into the internal chamber to admit reducing agent from an associated reducing agent tank, and an outlet passageway that opens from the internal chamber into the exhaust passageway, (ii) a plurality of valves including an inlet valve configured to selectively allow or block a flow of reducing agent through the inlet passageway into the housing and an outlet valve configured to selectively allow or block a flow of reducing agent through the outlet passageway into the exhaust passageway, and (iii) a thermal management system including a heater configured to selectively heat reducing agent in the internal chamber of the housing before injection of the reducing agent into the exhaust passageway and at least one cooling element coupled to at least one electric component included in the doser to cool the at least one electric component so as to prevent the at least one electronic component from overheating during operation of the doser in the exhaust aftertreatment system.

Clause 24. The vehicle of clause 23, any other suitable clause, or any combination of clauses, wherein the thermal management system further includes a control unit coupled to the at least one cooling element and the doser, and wherein the control unit is configured to direct the cooling element to selectively cool the at least one electronic component in response to a temperature of the internal combustion engine exceeding an engine temperature value.

Clause 25. The vehicle of clause 24, any other suitable clause, or any combination of clauses, wherein the exhaust aftertreatment system further comprises a diesel particulate filter fluidly coupled to the exhaust passageway.

Clause 26. The vehicle of clause 25, any other suitable clause, or any combination of clauses, wherein the control unit is coupled to the diesel particulate filter and configured to direct the at least one cooling element to selectively cool the at least one electronic component in response to a temperature of the diesel particulate filter exceeding a predetermined filter temperature value.

While the disclosure has been illustrated and described in detail in the foregoing drawings and description, the same is to be considered as exemplary and not restrictive in character, it being understood that only illustrative embodiments thereof have been shown and described and that all changes and modifications that come within the spirit of the disclosure are desired to be protected.

The invention claimed is:

1. A doser adapted for use in an exhaust aftertreatment system to inject a reducing agent into an exhaust passageway of the exhaust aftertreatment system, the doser comprising a doser body including a housing that defines a internal chamber, an inlet passageway that opens into the internal chamber to admit reducing agent from an associated reducing agent tank, and an outlet passageway that opens from the internal chamber into the exhaust passageway, a plurality of valves including an inlet valve configured to selectively allow or block a flow of reducing agent through the inlet passageway into the housing and an outlet valve configured to selectively allow or block the flow of reducing agent through the outlet passageway into the exhaust passageway, and a thermal management system including a heater configured to selectively heat reducing agent in the internal chamber of the housing before injection of the reducing agent into the exhaust passageway and at least one cooling element coupled to at least one electronic component included in the doser to cool the at least one electronic component so as to prevent the at least one electronic component from overheating during operation of the doser in the exhaust aftertreatment system.

2. The doser of claim 1, wherein the at least one cooling element is a thermoelectric cooling element configured to cool the at least one electronic component when supplied electronic energy.

3. The doser of claim 2, wherein the at least one electronic component is either the inlet valve or the outlet valve and the at least one cooling element is in contact with the inlet valve or the outlet valve to cool the inlet valve or the outlet valve.

4. The doser of claim 3, wherein the at least one electronic component includes two electronic components, the two electronic components are the inlet valve and the outlet valve, and the at least one cooling element is in contact with the inlet valve and the outlet valve to cool the inlet valve and the outlet valve.

5. The doser of claim 2, wherein the thermal management system further includes a control unit coupled to the at least one cooling element, and wherein the control unit is configured to direct the thermoelectric cooling element to cool the outlet valve in response to at least one of (i) a temperature within the doser body exceeding a predetermined agent temperature value and (ii) a temperature of the exhaust gases in the exhaust passageway exceeding a predetermined exhaust gas temperature value.

6. The doser of claim 5, wherein the control unit includes a temperature sensor configured to measure a temperature of the reducing agent in the doser body and a controller coupled to the at least one cooling element and the temperature sensor, and wherein the controller is configured to direct the at least one cooling element to cool the outlet valve in response to the temperature measured by the temperature sensor being above the predetermined agent temperature value.

7. The doser of claim 5, wherein the control unit includes a temperature sensor configured to measure a temperature of the exhaust gases in the exhaust passageway and a controller coupled to the at least one cooling element and the temperature sensor, and wherein the controller is configured to direct the at least one cooling element to cool the outlet valve in response to the temperature measured by the temperature sensor being above the predetermined exhaust gas value.

8. The doser of claim 2, wherein the at least one electronic component is the inlet valve and the at least one cooling element is in contact with the inlet valve to cool the inlet valve.

9. The doser of claim 1, wherein the at least one electric component includes a first cooling element in contact with the outlet valve to cool the outlet valve and a second cooling element in contact with the inlet valve to cool the inlet valve.

10. The doser of claim 9, wherein the thermal management system further includes a control unit coupled to the first and second cooling elements and the doser, and wherein the control unit is configured to direct each of the first and second cooling elements to selectively cool the respective electronic component to control a temperature of the respective electronic component included in the doser in response to at least one of (i) a temperature within the doser body exceeding a predetermined agent temperature value and (ii) a temperature of the exhaust gases in the exhaust passageway exceeding a predetermined exhaust gas temperature value.

11. An exhaust aftertreatment system for dosing reducing agent into a flow of exhaust gases to reduce nitrous oxides in the flow of exhaust gases, the system comprising
an exhaust conduit defining an exhaust passageway for receiving the flow of exhaust gases therein,
a reducing agent mixer fluidly coupled with the exhaust conduit and configured to receive the flow of exhaust gases and inject the reducing agent into the flow of exhaust gases, the reducing gent mixer including
a mixing can defining at least a portion of the exhaust passageway for receiving the flow of exhaust gases therein, and
a doser mounted to the mixing can and configured to inject the reducing agent into the exhaust passageway of the exhaust aftertreatment system, the doser comprising (i) a doser body including a housing that defines a internal chamber, an inlet passageway that opens into the internal chamber to admit the reducing agent from an associated reducing agent tank, and an outlet passageway that opens from the internal chamber into the exhaust passageway, (ii) a plurality of valves including an inlet valve configured to selectively allow or block a flow of reducing agent through the inlet passageway into the housing and an outlet valve configured to selectively allow or block the flow of reducing agent through the outlet passageway into the exhaust passageway, and (iii) a thermal management system including a heater configured to selectively heat reducing agent in the internal chamber of the housing before injection of the reducing agent into the exhaust passageway and at least one cooling element coupled to at least one electronic component included in the doser to cool the at least one electric component so as to prevent the at least one electronic component from overheating during operation of the doser in the exhaust aftertreatment system.

12. The system of claim 11, wherein the thermal management system further includes a control unit coupled to the at least one cooling element and the doser, and wherein the control unit is configured to direct the at least one cooling element to selectively cool the at least one electronic component in response to at least one of (i) a temperature within the doser body exceeding a predetermined agent temperature value and (ii) a temperature of the exhaust gases in the exhaust passageway exceeding a predetermined exhaust gas temperature value.

13. The system of claim 12, further comprising a diesel particulate filter fluidly coupled to the exhaust passageway, and wherein the control unit is coupled to the diesel particulate filter and configured to direct the at least one cooling element to selectively cool the at least one electronic component in response to a temperature of the diesel particulate filter exceeding a predetermined filter temperature value.

14. An over the road vehicle, the vehicle comprising
an internal combustion engine configured to produce a flow of exhaust gases that are conducted through an exhaust passageway defined by an exhaust conduit, and
an exhaust aftertreatment system comprising
a mixing can defining at least a portion of the exhaust passageway for receiving the flow of exhaust gases therein, and
a doser mounted to the mixing can and configured to inject a reducing agent into the exhaust passageway of the exhaust aftertreatment system, the doser comprising (i) a doser body including a housing that defines a internal chamber, an inlet passageway that opens into the internal chamber to admit reducing agent from an associated reducing agent tank, and an outlet passageway that opens from the internal chamber into the exhaust passageway, (ii) a plurality of valves including an inlet valve configured to selectively allow or block the flow of reducing agent through the inlet passageway into the housing and an outlet valve configured to selectively allow or block a flow of reducing agent through the outlet passageway into the exhaust passageway, and (iii) a thermal management system including a heater configured to selectively heat reducing agent in the internal chamber of the housing before injection of the reducing agent into the exhaust passageway and at least one cooling element coupled to at least one electric component included in the doser to cool the at least one electric component so as to prevent the at least one electronic component from overheating during operation of the doser in the exhaust aftertreatment system.

15. The vehicle of claim 14, wherein the thermal management system further includes a control unit coupled to the at least one cooling element and the doser, and wherein the control unit is configured to direct the at least one cooling element to selectively cool the at least one electronic component in response to a temperature of the internal combustion engine exceeding an engine temperature value.

16. The vehicle of claim 15, wherein the exhaust aftertreatment system further comprises a diesel particulate filter fluidly coupled to the exhaust passageway, and wherein the control unit is coupled to the diesel particulate filter and configured to direct the at least one cooling element to selectively cool the at least one electronic component in response to a temperature of the diesel particulate filter exceeding a predetermined filter temperature value.

* * * * *